(12) United States Patent
McLoone

(10) Patent No.: US 7,189,017 B2
(45) Date of Patent: *Mar. 13, 2007

(54) DUAL NAVIGATION CONTROL COMPUTER KEYBOARD

(75) Inventor: Hugh E. McLoone, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/245,259

(22) Filed: Oct. 7, 2005

(65) Prior Publication Data

US 2006/0029451 A1    Feb. 9, 2006

Related U.S. Application Data

(63) Continuation of application No. 10/631,013, filed on Jul. 31, 2003, now Pat. No. 6,986,614.

(51) Int. Cl.
*B41J 5/10* (2006.01)

(52) U.S. Cl. .............. 400/472; 345/157; 345/168; 345/184; 361/680; 361/686

(58) Field of Classification Search .............. None
See application file for complete search history.

(56) References Cited

U.S. PATENT DOCUMENTS

| | | |
|---|---|---|
| 3,541,521 A | 11/1970 | Koster |
| 4,404,865 A | 9/1983 | Kim |
| 4,712,101 A | 12/1987 | Culver |
| 4,720,703 A | 1/1988 | Schnarel, Jr. et al. |
| 5,374,942 A | 12/1994 | Gilligan et al. |
| 5,473,344 A | 12/1995 | Bacon et al. |
| 5,477,508 A | 12/1995 | Will |
| 5,621,436 A | 4/1997 | Solhjell |
| 5,714,983 A * | 2/1998 | Sacks .............. 345/168 |
| 5,748,185 A | 5/1998 | Stephan et al. |
| 5,771,037 A | 6/1998 | Jackson |
| 5,781,172 A | 7/1998 | Engel et al. |
| 5,874,939 A | 2/1999 | Galvin |
| 5,943,052 A | 8/1999 | Allen et al. |
| 6,075,522 A | 6/2000 | Milroy |
| 6,084,570 A | 7/2000 | Milroy |
| 6,204,837 B1 | 3/2001 | Smith |

(Continued)

OTHER PUBLICATIONS

Product Brochure Sheet, "Ultraflat compact keyboard with integrated trackball", Slim Line, published prior to filing application, 1 sheet.

(Continued)

*Primary Examiner*—Daniel J. Colilla
*Assistant Examiner*—Jill E. Culler
(74) *Attorney, Agent, or Firm*—Banner & Witcoff, Ltd.

(57) ABSTRACT

A computer keyboard may include an assembly for scrolling and navigating an image in multiple directions relative to a display screen. A computer keyboard may include an assembly for control of a graphical object, insertion point or mouse cursor in multiple directions relative to objects on a display screen. Two control devices are provided onto each side of a computer keyboard. The devices are configured such that both control a graphical cursor. One device controls a graphical cursor and the other device controls view scrolling of an image. In yet another aspect, the functionality of the devices for cursor control or view scrolling is selectable.

19 Claims, 12 Drawing Sheets

U.S. PATENT DOCUMENTS

| | | | |
|---|---|---|---|
| 6,288,706 B1 | 9/2001 | Leman | |
| 6,323,844 B1 | 11/2001 | Yeh et al. | |
| 6,489,950 B1 * | 12/2002 | Griffin et al. | 345/168 |
| 6,580,421 B1 | 6/2003 | Leman | |
| 6,624,803 B1 * | 9/2003 | Vanderheiden et al. | 345/156 |
| 2002/0140668 A1 | 10/2002 | Crawford | |

OTHER PUBLICATIONS

Product Brochure Sheet, "Multifunctional card and barcode reading keyboards with touchpad and freely programmable keys", Advance Performance Line, published prior to filing application, 1 sheet.

Product Brochure Sheet, "19 inch compact keyboard with integrated touchpad", Advance Performance Line, published prior to filing application, 1 sheet.

Product Brochure Sheet, "TouchStream Products", The Ultimate User Interface, FingerWorks, published priot to filing application, 2 sheets.

Product Brochure Sheet, "Keyboards", Key Tronic Corporation, published prior to filing applicaton, 1 sheet.

* cited by examiner

DUAL NAVIGATION CONTROL COMPUTER KEYBOARD

CROSS-REFERENCE TO RELATED APPLICATIONS

This application is a continuation of U.S. application Ser. No. 10/631,013 filed Jul. 31, 2003, now U.S. Pat. No. 6,986,614 which is hereby incorporated by reference.

FIELD OF THE INVENTION

The present invention pertains to a computer keyboard configured for navigation of a graphical user interface of a host computer. More particularly, the present invention relates to a computer keyboard that may be operatively connected to a host computer including an assembly for scrolling an image (i.e., navigating view) in multiple directions relative to a display screen and to a computer keyboard with an assembly for cursor control that can move a graphical object (i.e., mouse arrow or insertion point) in multiple axes relative to objects on a display screen.

BACKGROUND OF THE INVENTION

Conventional computer systems, especially computer systems using graphical user interface (GUI) systems, accept user input from a conventional input device, such as a keyboard for entering text, and a pointing device, such as a mouse for operating the graphical user interface.

A traditional notion of user interaction is generally in front of a desktop computer or at least sitting within close viewing proximity to a display screen as with laptop computers. Conventional systems are problematic in meeting the challenge of the new user interaction. The evolution of new media models of computing, such as digital television, digital music, digital movies, have changed the traditional view of the GUI, and the manner in which users can interact with their computers. In one example of a home theater environment, users may be sitting at a couch at distance away from a display screen. At one time, the users may want to manipulate a GUI to obtain and watch live TV or recorded TV, digital home movies and picture slideshows, and watch DVDs movies. In this "lap use" or "couch-use" environment, a traditional notion of desktop user interaction can be inefficient and frustrating for many individuals. While the user may attempt to employ a traditional handheld remote control, it provides limited cursor control, if any, for computing tasks using traditional graphical user interface. At another time, users may want to switch to productivity activities such as entering and editing text, but may find it awkward and inefficient to attempt to use a traditional remote control. Also without a desktop or work surface, a "regular" mouse is simply not a viable option for the user. Thus, the users do not realize the full benefits of experiencing new media and productivity software.

What is needed is an apparatus and method to support user interaction for with a keyboard at a distance from display screen for manipulating the GUI for the new media technologies and productivity activities, such as creation and modification of electronic documents, spreadsheets, database fields, drawings, photos and the like.

SUMMARY OF THE INVENTION

The present invention pertains to a computer keyboard configured for navigation of a graphical user interface of a host computer. A computer keyboard may include an assembly for scrolling and navigating an image in multiple directions relative to a display screen. In one aspect, the keyboard may include a first navigation section and a second navigation section that are laterally disposed in which an alphanumeric section is disposed between the first navigation section and the second navigation section. An aspect of the present invention allows for a user to have bi-manual anatomical adaptability.

In another aspect, the first navigation section may include a first input device configured to receive manual movement and responsive thereto the first input device is configured for scrolling an image relative to an image display screen along perpendicular axes. The second navigation section may include a second input device configured to receive manual movement and responsive thereto configured for moving a graphical pointer relative to the perpendicular axes. Hence, the input devices are disposed laterally on a computer keyboard to promote a biomechanical neutral position of the user.

In one aspect, two cursor control devices are provided onto each side of a computer keyboard. In one aspect, the devices are configured such that both control a graphical cursor. In this manner, user collaboration can be obtained in which two persons simultaneously manipulate a graphical user interface with the same keyboard. This can be advantageous for interactive computer gaming, instruction and learning, and business collaboration.

In another aspect, one device controls a graphical cursor and the other device controls view scrolling of an image. In yet another aspect, the functionality of the devices for cursor control or view scrolling is selectable. In this manner, a user can have a keyboard designed for anatomic handedness, e.g., left-handed or right-handed.

In an aspect, a computer keyboard is configured for navigation of a graphical user interface of a host computer. A trackball device is disposed with a keyboard housing in which the trackball device includes a movable ball configured to receive manual movement and responsive thereto configured for scrolling an image relative to an image display screen in a vertical direction and a horizontal direction. A second input device configured to receive manual movement and is responsive thereto configured for moving a graphical pointer relative to two dimensions of the image display screen.

Thus, aspects and features of the present invention enable users to enjoy experiences of rich digital media and gaming with a computer system and navigate the Internet, send and receive electronic mail messages or Instant Messaging, run spreadsheets, create documents and presentations with ease of operation in a new media environment.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

DETAILED DESCRIPTION OF THE INVENTION

Illustrative Operating Environment

A peripheral device, such as a keyboard, may be operatively connected to a host computer and includes input devices which are configured for freeform cursor control or scrolling for moving an image in multiple axes relative to a display screen. In one aspect, a keyboard is configured for two-handed functionality with a cursor control device and a scrolling device. A trackball device and touchpad, either both alike or each, can be used on either side of a keyboard for scrolling and/or cursor control. Scrolling and cursor control may be accomplished by one device, e.g., a trackball device or a touchpad. Alternatively, scrolling and cursor control can be provided by a wheel and touchpad or a wheel and a trackball device. Various aspects of the present invention may at least be described in the general context of apparatus and computer-executable instructions, such as program modules, executed by one or more computers or other devices. Accordingly, it may be helpful to briefly discuss the components and operation of a general purpose computing environment on which various aspects of the present invention may be implemented. Such an illustrative host computer system is illustrated in FIG. 1.

Figure 1:
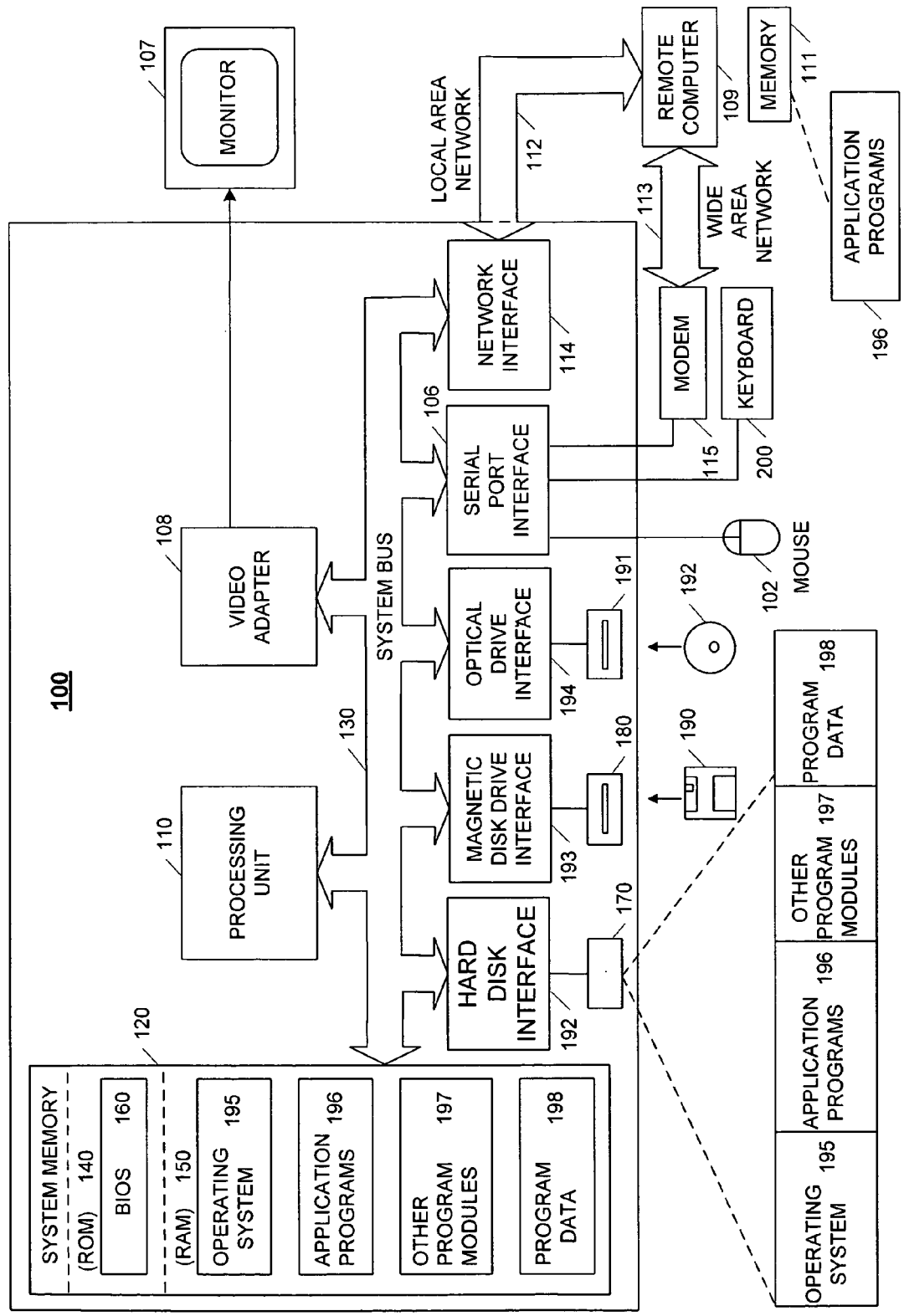
FIG. 1 is a functional block diagram of an illustrative general-purpose digital computing environment in which one or more aspects of the present invention may be implemented.

Accordingly, FIG. 1 illustrates a schematic diagram of an illustrative general-purpose digital computing environment that may be used to implement various aspects of the present invention. In FIG. 1, a host computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 200 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device with a display screen is also connected to the system bus 130 via an interface, such as a video adapter 108.

The computer 100 may operate in a networked environment using logical connections to one or more remote computers, such as a remote computer 109. The remote computer 109 may be a server, a router, a network PC, a peer device, or other common network node, and may include many or all of the elements described above relative to the computer 100, although only a memory storage device 111 with related applications programs 196 have been illustrated in FIG. 1. The logical connections depicted in FIG. 1 include a local area network, (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Keyboard Environment

Figure 2:
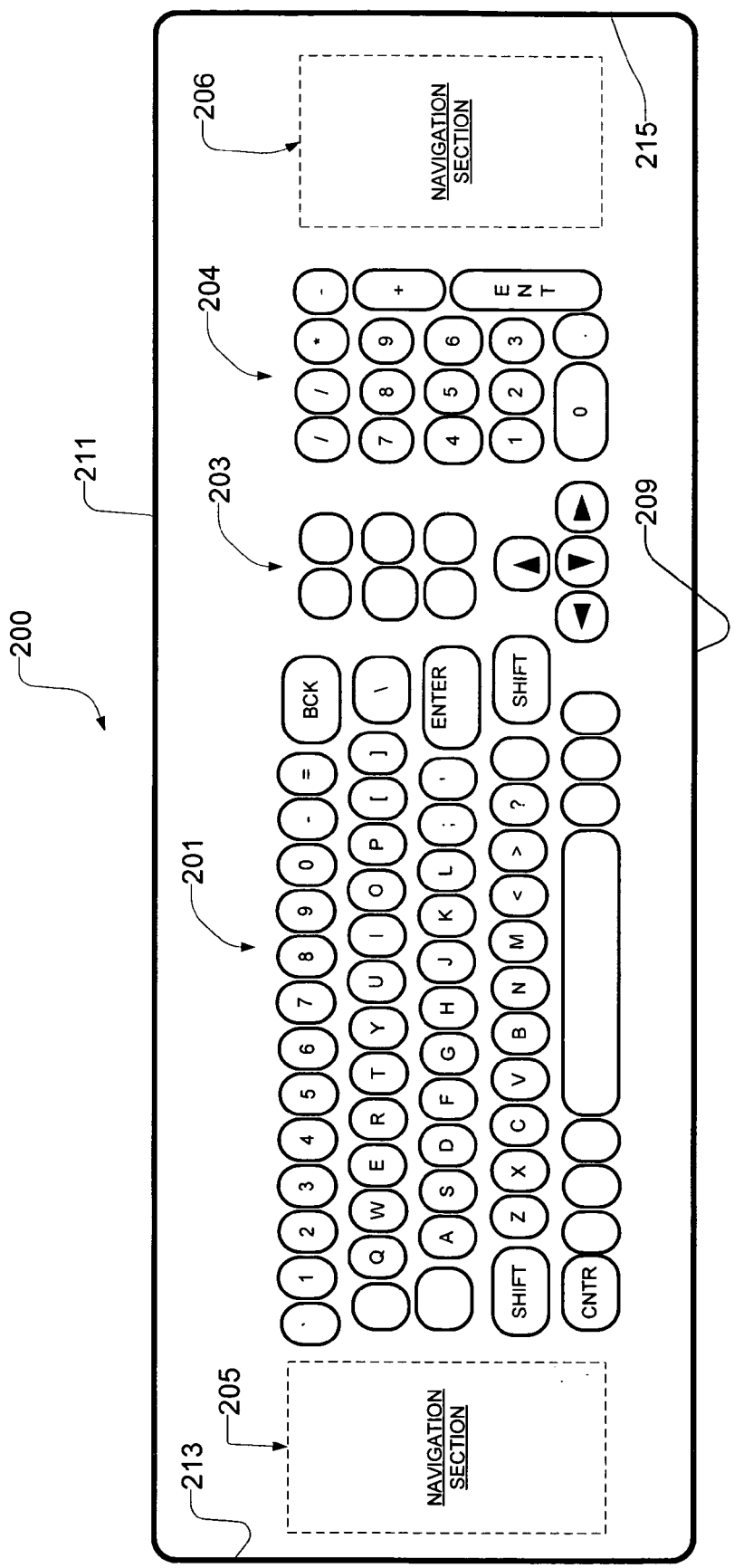
FIG. 2 is a schematic representation of a keyboard according to one embodiment of the present invention for scrolling and controlling an image on a display screen of a host computer.

Exemplary keyboard designs in accordance with one or more aspects of the present invention are shown in FIGS. 2–12. Referring to FIG. 2, keyboard 200 includes an alphanumeric section 201, an editing section 203, a numeric section 204, a left navigation section 205, and a right navigation section 206. For frame of reference purposes, the keyboard 200 and other keyboard designs herein include a front edge 209 adjacent the user during normal use, and a back edge 211 distal from the user during normal use. Accordingly, an object is said herein to be "behind" another object when it is between that object and the back edge 211. An object is said herein to be "directly behind" another object when it is between that object and the back edge 211 and at least partially located within the lateral bounds of that object extending in the front-to-back direction. An object is said herein to be "in front of" another object when it is between that object and the front edge 209. Further, the keyboard 200 also a left edge 213 and a right edge 215. The direction "lateral" defines the general directions from the left edge 213 to the right edge 215 and from the right edge 215 to the left edge 213.

The alphanumeric section 201, sometimes referred to as the QWERTY section, includes keys for each of the letters of the alphabet, each of the digits 0–9, and various punctuation symbols. Nevertheless, other key placements and characters of languages in lieu of English may be used. The editing section 203, preferably located immediately to the right of the alphanumeric section 201, preferably includes four arrow keys, and Delete, Insert, Home, End, PageUp, and PageDown keys. Numeric section 204 is preferably disposed on the right of the editing section 203 and, includes Digit 0–9 keys; arithmetic operation keys including a Divide "/" key, a Multiply "*" key, a Subtract "−" key, and an Addition "+" key; a Decimal Separator key; an Enter key and a Num Lock positioned in the upper left corner of the numeric section 203 above the Digit 7 key.

The keyboard 200 can have wired or wireless connections to the host computer 100 as is known in the art. For example, a wireless connection may be the widely available communication standards such as, the Infrared Data Association ("IrDA") and standard and Bluetooth radio-frequency ("RF") specification and protocols. These wireless communication protocols provide low-cost, short-range, cross-platform, point-to-point communications at various transfer rates for devices employing the standardize protocol. There are various suppliers of compatible hardware for transceivers and interfacing software modules.

For reference purposes the term "scrolling" is used herein to describe the movement of an image relative to a display screen in a particular direction. For example, the term "scroll down" as used herein relates to moving the contents of a current display screen down an amount. Similarly, the terms "scroll up", "scroll left" or "scroll right" pertain to moving the contents of the screen an amount in these directions. The term scrolling as used herein also includes panning, which is the automatic scrolling of an image. The term "cursor control" is used herein to describe the movement of a graphical object, insertion point, or point of mouse operation relative to a display screen in a particular direction.

Touchpad

Figure 3:
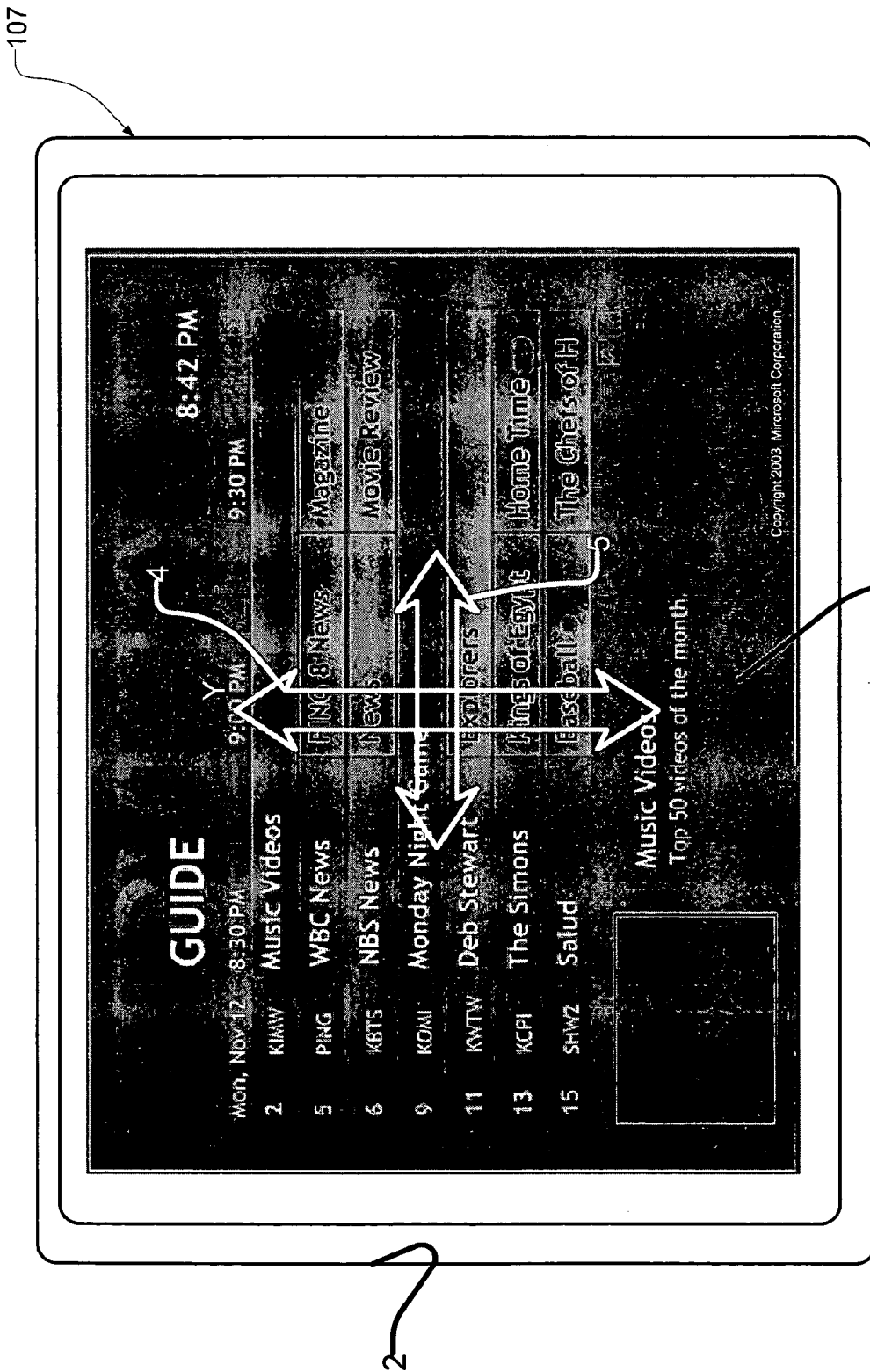
FIG. 3 is a schematic representation of a display screen that can be used with one or more aspects of the present invention.
Figure 4:
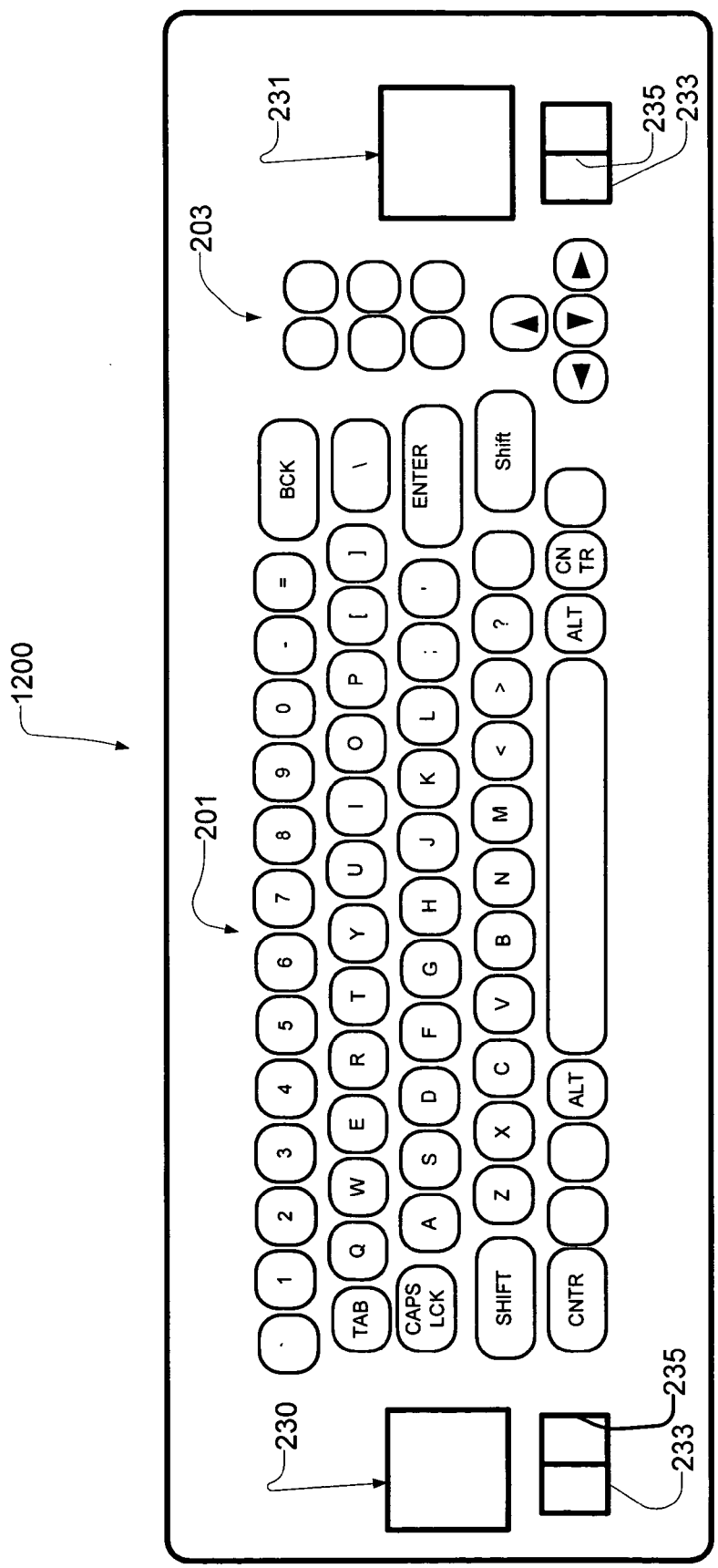
FIG. 4 is a schematic representation of a keyboard according to one embodiment of the present invention.

With reference to FIG. 4, a keyboard 1200 with navigation sections 205, 206 may include multi-axis devices configured for scrolling an image 1 in multiple directions and along multiple axes 4, 5 (X, Y) relative to a display screen 2 used with a host computer 100 and for freeform cursor control (See FIG. 3). In a preferred arrangement shown in FIG. 4, navigation sections 205, 206 may include a left touchpad 230 and a right touchpad 231 dispose on the left side and right side, respectively. This arrangement provides for minimal thickness to the keyboard to reduce weight and greater portability and acceptable performance in terms of speed and accuracy. Touchpad 230 and touchpad 231 may be any appropriate shape, such as a square, rectangular, diamond, circular, cross, or oval. In a rectangular or square shape, a touchpad may be 35 mm to 60 mm in width or length. In one construction, the touchpad can be 47 mm square. Nevertheless, other navigation devices known for cursor control can be employed, such as joysticks and d-pads. It will be appreciated that the navigations sections 205, 206 may include a touchstrip, a trackball or combination thereof, or other device that provides for one or two-dimensional movement of cursor and scrolling functionality.

With continued reference to FIG. 4, in one preferred construction, the presence of two laterally disposed touchpads 230, 231 or trackballs(shown in FIGS. 5–10), on each side of the keyboard advantageously allows for unfettered operation for the new media environment. In another construction, touchpad 230 can be configured for cursor control and the other touchpad 231 may be assigned scrolling functionality. Nevertheless, the configuration of the touchpad 230 and 231 could be reversed. In yet another construction for ambidextrous use, the touchpads 230 and 231 may be selectively switchable to be adapted to the anatomic handedness of the users, e.g., left-handed or right-handed person. In one arrangement of keyboard 1200, cursor control functionally can be on the left side and scrolling functionality on the right side for left hand users. Nevertheless, the specific functionalities of the touchpad 230 and 231 can be desirably selectable by the user. Thus, in one aspect of the present invention, users have the freedom to best suit a keyboard for their specific use and anatomical configuration. This is in contrast to conventional keyboards that forces a user force to adapt to undesirable keyboard configurations and functionality.

Trackball Device

Figure 5:
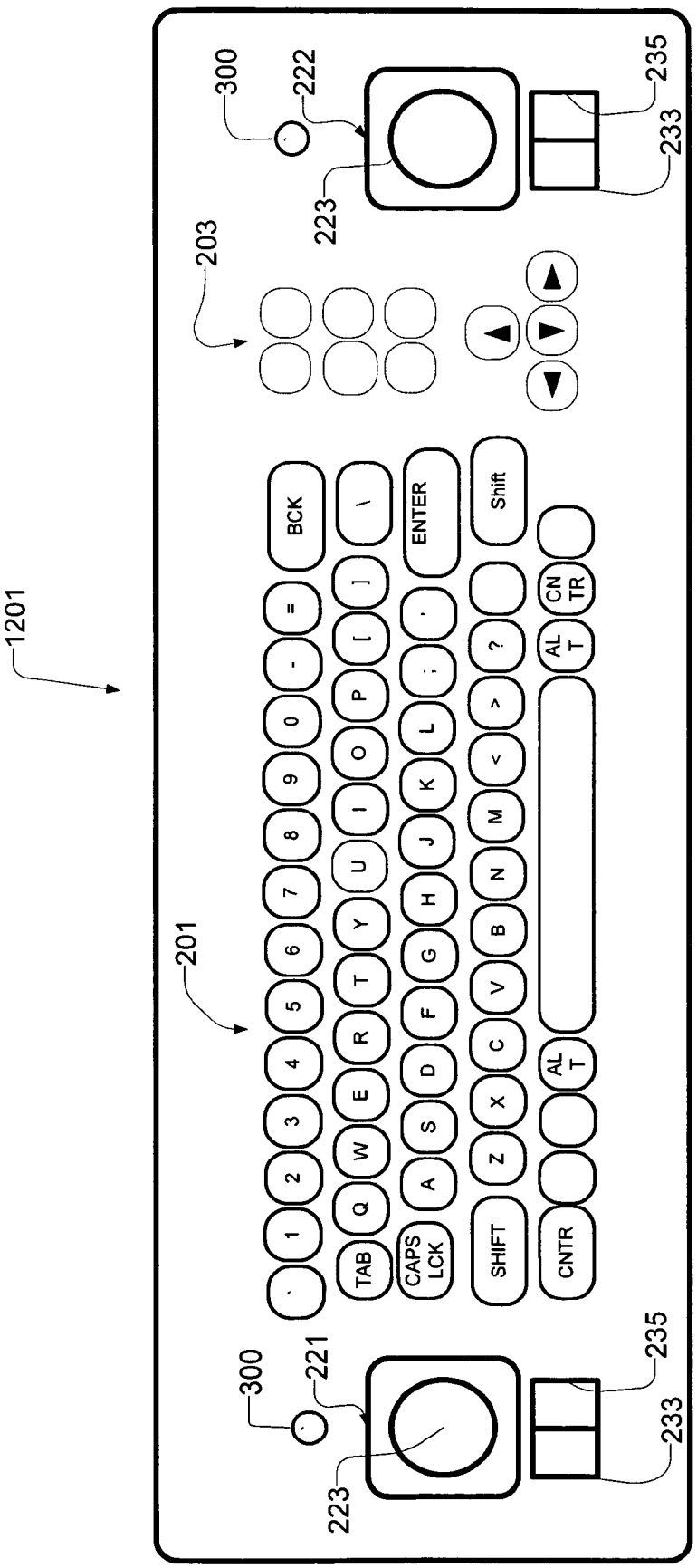
FIG. 5 is a schematic representation of a keyboard according to one embodiment of the present invention.

FIG. 5 illustrates a keyboard 1201 similar to the construction of keyboard 200, including a left trackball device 221 and a right trackball device 222 disposed on the left and right sides, respectively. The trackball devices 221, 222 are configured for dedicated cursor control or dedicated for view image scrolling. Alternatively, trackball device 221, 222 may be configurable for user selectable cursor control mode and scroll mode, e.g. to allow switching between scrolling and cursor control. Each trackball device 221, 222 preferably comprises a movable ball 223, such as a sphere, being rotatably mounted within an opening of keyboard housing 219. The ball 223 protrudes upwardly and is exposed above the housing 219 to allow for rotation by the fingers and hand of a user. Trackball devices 221, 222 transmit signals generated by a movement sensor (not shown). The signals are used to control a graphical cursor or pointer on a display of host computer 100.

In operation, a user rolls the ball in a desired direction relative to the keyboard housing 219, and rotation of the movable ball on two orthogonal axes is sensed. As known in the art, two signals are produced representative of the rotation of the movable ball 219 along the two axes. With respect to cursor control, rotation of the ball along the two axes is translated into movement of the cursor in two dimensions for freeform control of a cursor on the display screen 1. The movable ball 223 may be sensed by any conventional mechanical or optical sensing system or any other desired technique. For example, if a mechanical sensing system is used, the ball 223 may be supported on a pair of perpendicular rollers. If an optical sensing system is used, a light source may be reflected off of a non-exposed portion of the ball 223, and an optical sensor may determine the relative movement of the ball 223.

In one embodiment, trackball devices 221, 222 are mode selectable between scrolling and cursor control. There are number of ways to evoke a cursor control mode to a scroll mode or a scroll mode to a cursor control mode. In one embodiment for a scrolling configuration, the movable ball 223 can be depressible to contact a lower proximity microswitch configured to evoke a scroll mode with the operating software of host computer 100. In this configuration, the ball 223 will be upwardly biased with a spring or other biasing device.

In one embodiment shown in FIG. 5, one or more buttons may be disposed on the keyboard 1201 to toggle the cursor control to scroll mode and the like. In a single button configuration, the button 300 (see FIG. 5) may have multi-stage settings. Alternatively, a physical dial(not shown) can be provided with a pointer to select the mode. In a button or dial embodiment, the keyboard 1201 can have various indicia to corresponding to the selected functionality. In yet another embodiment, the keyboard 1201 can be voice configurable to change to mode to and from cursor control model and scroll mode. For example, a user can say a voice command such as "trackball" to recognize the track device 221 is ready to be configured. Then, a user can say "scroll" to change the mode from cursor control mode to scrolling mode. Alternatively, a user can say "cursor" or "mouse" to the change the state to cursor movement. Thus, a user can work with their hands for other tasks. It should be recognized that the present invention is not limited to the specific voice commands described in the foregoing, but other commands to perform the intended functions are possible. Nevertheless, toggle functionality and voice configuration can be provided with keyboard 1200, 1203, 1205, 1209, 1211, or 1213.

In one aspect, keyboard 1201 or host computer 100 may have a change in state indicator. This indicator informs the user of the state of the trackball device 221 or trackball device 222 regarding cursor control or scroll configuration. There are many possibilities to provide a change in state feedback to the user. For example, a graphical icon or a series of icons may be resident in a Task Bar of a graphical user interface such as MICROSOFT® WINDOWS®. Further, the "Control Panel" can be used to indicate the cursor control state or the scrolling state. In another embodiment, light emitting diodes may be disposed on the keyboard 200.

Figure 6:
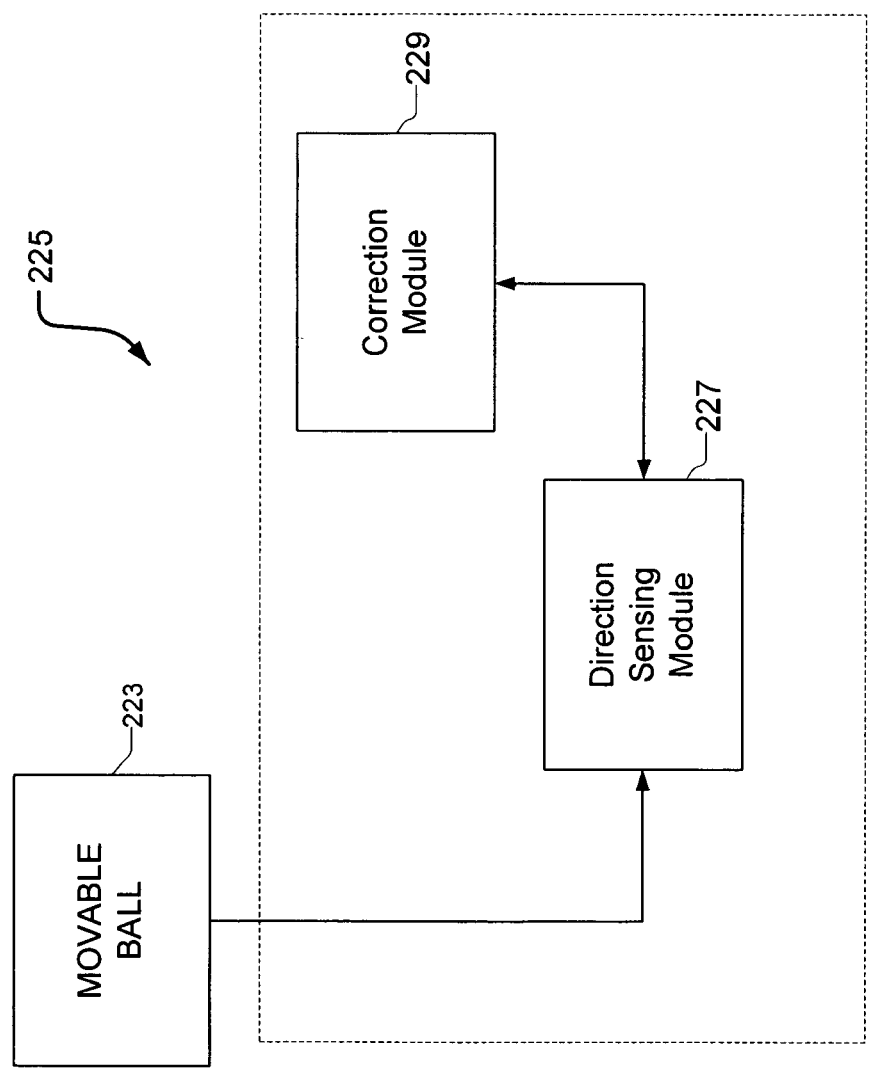
FIG. 6 is a functional block diagram of a scrolling sensing system according to an embodiment of the present invention.
Figure 7:
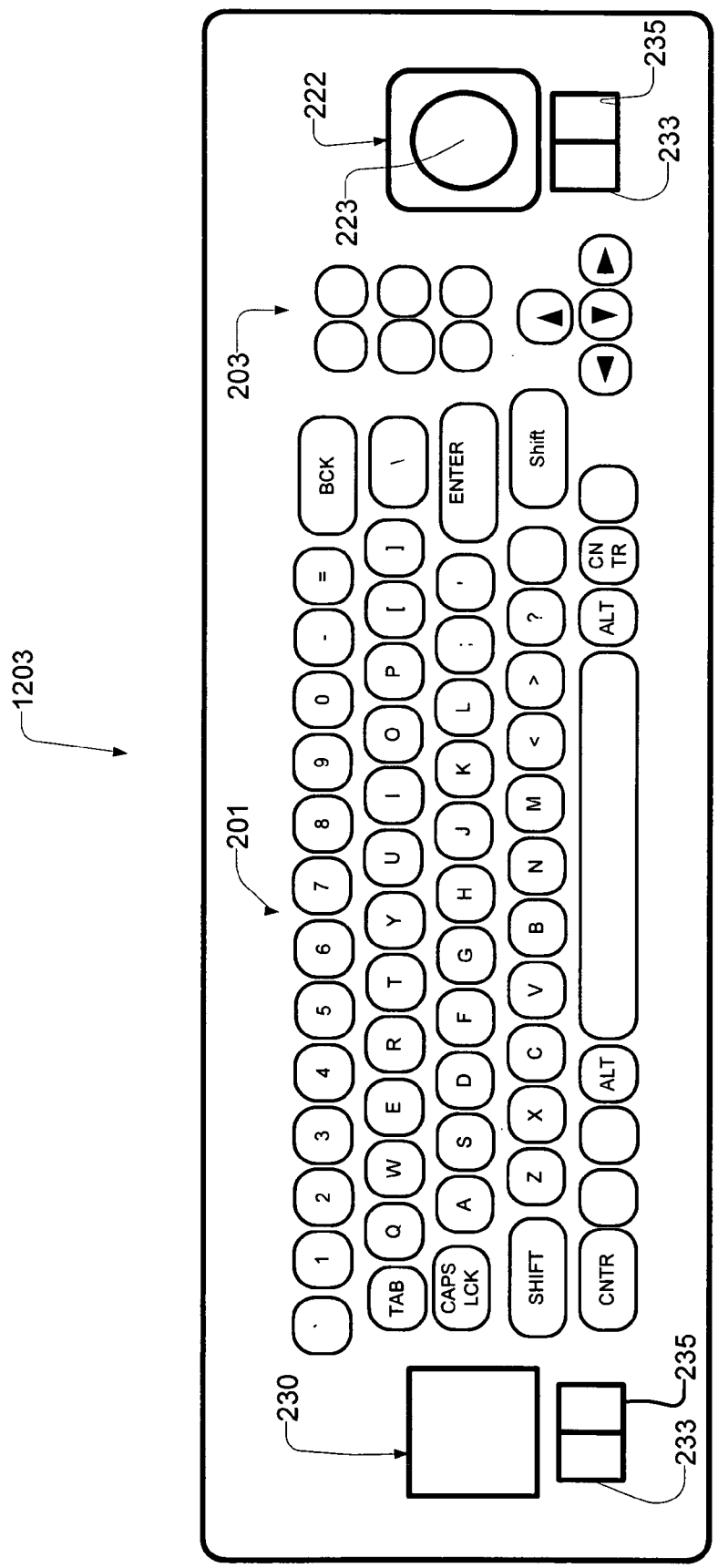
FIG. 7 is a schematic representation of a keyboard according to one embodiment of the present invention.
Figure 8:
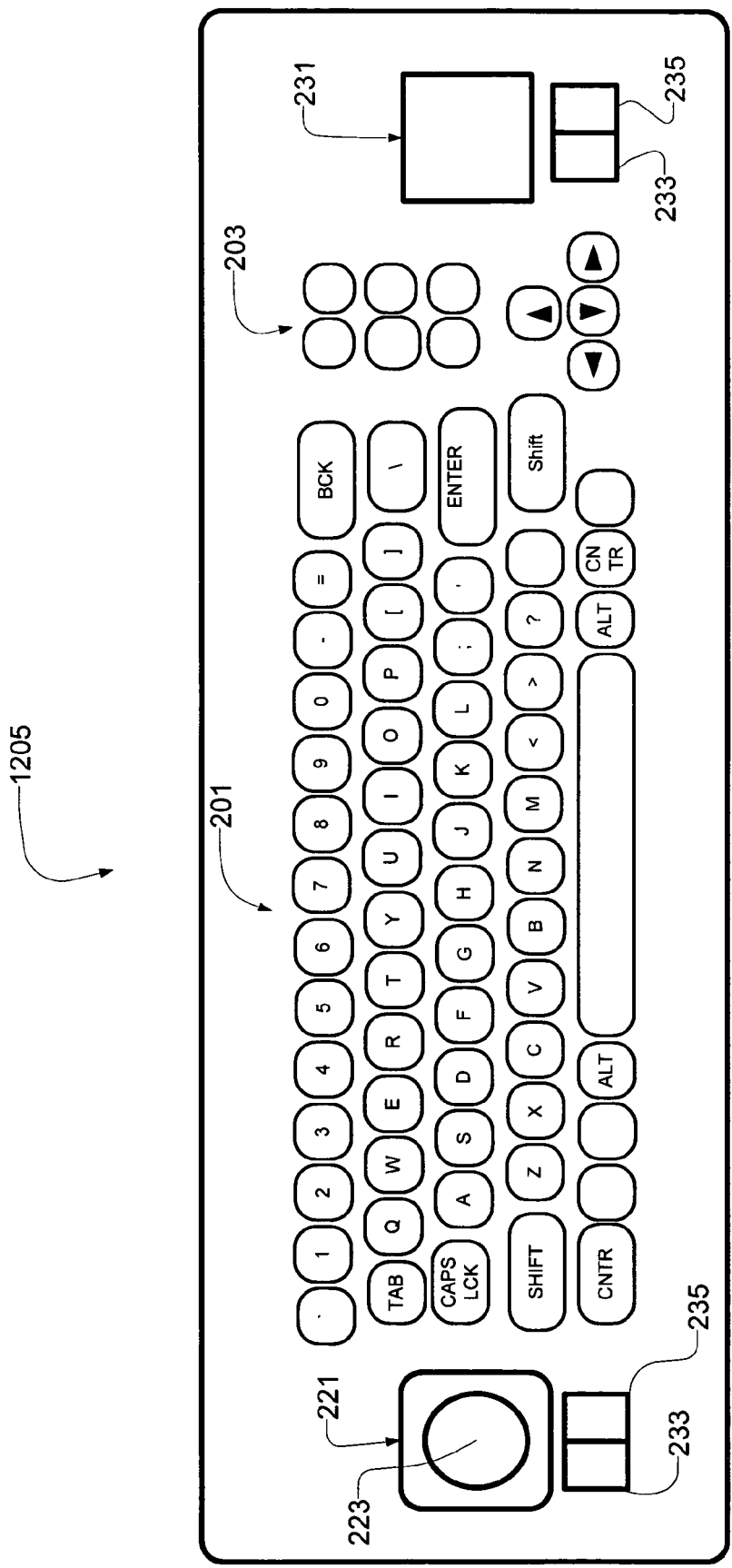
FIG. 8 is a schematic representation of a keyboard according to one embodiment of the present invention.

Referring to FIG. 6, in one embodiment, the trackball devices 221, 222 are configured with a scroll compensation system 225 for filtering minor or unintended lateral or forward movement during directional scrolling to avoid unintentional scroll actions. For instance, during vertical scrolling, minor rotation in the lateral direction of the ball may cause the scrolling to change directions to horizontal scrolling. Scroll compensation system 225 can determine lateral rotation indicative of horizontal scrolling to a threshold level in which lateral rotation of ball 223 under that level will not change to horizontal scrolling. In another case, during horizontal scrolling, minor rotation or small changes in the transverse direction can cause the horizontal scrolling to change to vertical scrolling. Scroll compensation system 225 can determine transverse rotation indicative of vertical scrolling to a threshold level in which transverse rotation of ball 223 under a certain level will not change to vertical scrolling.

Referring to FIG. 6, scroll compensation system 225 includes a direction sensing module 227 that is operatively coupled to a correction module 229. As used herein the terms "operative coupling" is defined as electrical wired and/or logical connections via software instructions between components. Direction sensing module 227 is configured to provide vertical scrolling or horizontal scrolling. In one aspect, for vertical scrolling, direction sensing module 227 determines whether the movable ball 223 is being rolled in a forward or backward motion during user movement. Thus, sensing module 227 determines whether a rotational signal is representative of the rotation of the ball 223 for the Y-axis direction. This motion is translated into movement for vertical scrolling of image 1 on display screen. Likewise, in horizontal scrolling action, direction sensing module 227 determines whether the movable ball 223 is being rolled in a lateral direction, e.g., left-to-right or right-to-left. Sensing module 227 determines whether a rotational signal is representative of the rotation of the ball in for the X-axis direction. This motion is translated into movement for horizontal scrolling.

Correction module 229 receives the directional signal from the sensing module 227 during rotation of the movable ball 223. Specialized software or other application software may filter inadvertent actuations to avoid unintentional scroll actions. The filtering actions are a function of a compensation parameter and detection of a transition state of movable ball 223. A transition state occurs when motion in one direction changes to another direction. For example, a "Y-X transition" is defined as a detection of state change from Y-axis movement to X-axis movement of movable ball 223. An "X-Y transition state" is defined as detection of a state change from X-axis movement to Y-axis movement of movable ball 223.

In one embodiment, when scrolling vertically, horizontal actions may be filtered with respect to a compensation parameter, such as a predetermined elapsed time, after a Y-X transition state. If additional X-axis movement of the ball 223 is detected during this predetermined elapsed time, then horizontal scrolling is engaged. If, however, the X-axis movement duration is less than the predetermined elapsed time, then correction module 229 signals sensing module 227 to maintain vertical scrolling. That is, while there was a Y-X transition state in the movable ball 223, the system 225 provides some a scroll direction tolerance to ignore a transition state. In one example, compensation parameter, such as a predetermined elapsed time, can be 250 milliseconds after a Y-X transition state or X-Y transition state. Nevertheless, the compensation parameter may be embodied as a predetermined number of pulses or counts of an encoder. Such counts or pulses could designated directionally as "vertical counts" or "horizontal counts."

In one embodiment, when scrolling horizontally with the movable ball 223, vertical counts may be filtered. For example, vertical actions may be filtered with respect to a compensation parameter after a X-Y transition state. The compensation parameter could be predetermined elapsed time. Thus, if additional Y-axis movement of the ball 223 is detected during this predetermined elapsed time, then vertical scrolling is engaged. If, however, the Y-axis movement duration is less than the predetermined elapsed time, then correction module 229 signals sensing module 227 to maintain horizontal scrolling.

A ball diameter may be an appropriate range from 18 to 52 mm, preferably 35 mm. For ergonomic advantages, the height of the portion of the ball 223 above the outer surface of the keyboard housing should as closely match height of keys in the alphanumeric section 201. This configuration will avoid for user reaching up or down which might risk undesirable muscle strain.

In one aspect of trackball devices 221, 222, when configured as a cursor control device, the movable ball 223 rolls very smoothly. In another aspect of the trackball device, when configured as a scrolling device, an external surface may include slight detents. User tactile feedback may include a feeling of resistance to rotation or detents so users can better gauge their degree of movement. In an embodiment, the image 1 will scroll across the screen 2 at a constant, predetermined speed (See FIG. 3). The user may change or set this scrolling speed via known techniques. In another embodiment, the trackball devices 221, 222 have acceleration functionality for view scrolling longer distances for large images. The movable ball 223 can maintain angular momentum to during rolling. A user can begin a roll and then lift his or hers hand off the movable ball 223 to let it continue. Advantageously, this configuration may decrease finger movement while enhancing speed at longer distances. Thus, the user has less finger fatigue or muscle strain.

Referring to FIGS. 4–10, the navigation section 205 and 206 may further include one or more buttons, which may be arranged as a button array that includes, e.g., a first button 233 and a second button 235. The buttons are associated with the touchpads 230, 231 and trackball device 221, 222 to provide enhanced control of the graphical user interface. In one arrangement, the respective buttons, when engaged otherwise actuated by a user, may provide the same signals to emulate "left-click" and "right-click" events of a conventional mouse. In one example, the click events can be processed by the software operating in the general computing device 100 to provide a context menu.

Buttons 233, 235 can be biometrically positioned for access with index, middle, ring or thumb digits for finger placement. Button 233 and/or button 235 are preferably disposed in front of the touchpads 230, 231 and trackball device 221, 222. In one arrangement of the buttons, a finger of a user can easily move in a sweeping motion from the navigation device, if a user desires to perform a "left-click" or "right-click" operation. In a preferred construction, the lateral spacing is preferably be 19 mm center-to-center and may be a minimum of 15 mm center-to-center. Nevertheless, other lateral spacing between the buttons can be used, if appropriate. The button size may be preferably 160 mm square to a minimum of 64 mm square. Nevertheless, other configurations are contemplated.

FIGS. 4, 5 and 6–8 illustrate alternative arrangements of the keyboards according to one or more aspects of the present invention. Advantageously, ergonomic criteria for a point of contact between the user and the touchpad 230, 231 and trackball device 221, 222 is quantified and incorporated such that the user may grasp and use the device in a biomechanically neutral position. In a preferred construction, referring to FIGS. 4 and 5 touchpad 230, 231 and trackball device 221, 222 are disposed laterally on a keyboard to promote a biomechanical neutral position of the user. This lateral configuration advantageously helps reduce fatigue of the hand and wrist muscles. Such a neutral position is achieved when the flexors and extensors of the user's hand and wrist are in equilibrium, where intracarpal pressure is minimized and flexors and extensor muscles are positioned for optimal application of strength. A biomechanically neutral zone is achieved when the user's forearm is between pronation and supination and, as respects the wrist, when the user can control the device with the wrist not exceeding a maximum extension of about 30 degrees, a maximum radial deviation of about 15 degrees, and a maximum ulnar deviation of about 30 degrees. It should be recognized that with respect to a human hand, radial deviation is rotation of the wrist toward the thumb and ulnar deviation is rotation of the wrist toward the little finger. In considering biomechanics of a neutral position, a cursor control device is disposed substantially in front of and aligned with the user's shoulder and presented in straight angle, parallel to lateral edges of keyboard (213, 215). Thus, touchpad 230, 231 and trackball device 221, 222 are disposed on the right side for right-handed users and the left side for left-handed users. It should be recognized that ergonomic aspects are applicable to keyboards illustrated in FIGS. 9–12 as well.

An aspect of the present invention allows for the user to have bi-manual anatomical adaptability. Users have the freedom to best suit a keyboard for their specific use and anatomical configuration. In one keyboard construction 1203 shown in FIG. 7, touchpad 230 is provided on the left side and trackball device 222 is provided on the right side of keyboard 1203. In another keyboard construction 1205 shown in FIG. 8, trackball device 221 is provided on the left side and touchpad 231 is provided on the right side of keyboard 1205. These constructions provide for ambidextrous use, and may be selectively switchable to be adapted to the anatomic handedness of the users, e.g., left-handed or right-handed person. Cursor control functionally can be on the left side or right side and scrolling functionality on the left side or right side of the respective keyboard.

Scroll Wheel and Cursor Control Device

In one embodiment of the invention, there may be a scroll wheel associated with each cursor control device to provide scrolling functionality. According a preferred arrangement of a keyboard of the present invention, scrolling can be provided by a wheel and cursor control may be provided by a touchpad or a trackball device. As shown in the FIG. 9, the present invention may include a scroll wheel assembly 10 having a rotatable member 40 that can be used for scrolling an image 1 in multiple directions and along multiple axes (X, Y) relative to a display screen 2 used with a host computer 100. Scroll wheel assembly 10 is located on the right side of keyboard 1209 and is at least behind touchpad 231. As described in more detail hereinafter, in addition to its normal rotational movement for vertical scrolling, the rotatable member 40 may be moved laterally to horizontally scroll an image on the display screen. While scroll wheel assembly is shown the right side of keyboard 1211, it may be located on the left side as well (See FIG. 10). Further, scroll wheel assembly 10 may be provided as a navigational device or used in conjunction with other types of devices such as trackball device 221 as shown in the keyboard construction 1211 of FIG. 10.

Figure 9:
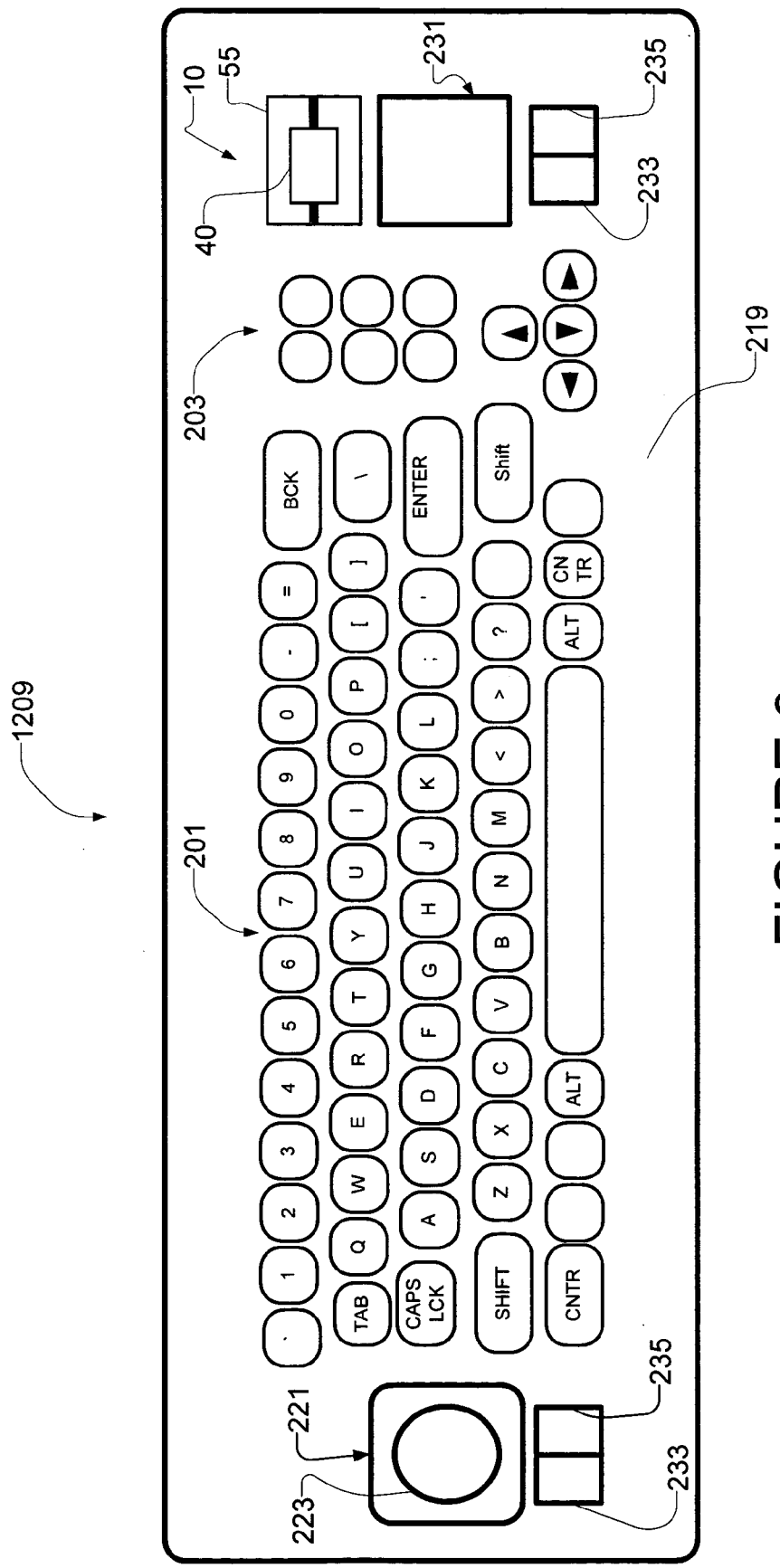
FIG. 9 is a schematic representation of a keyboard according to one embodiment of the present invention.
Figure 10:
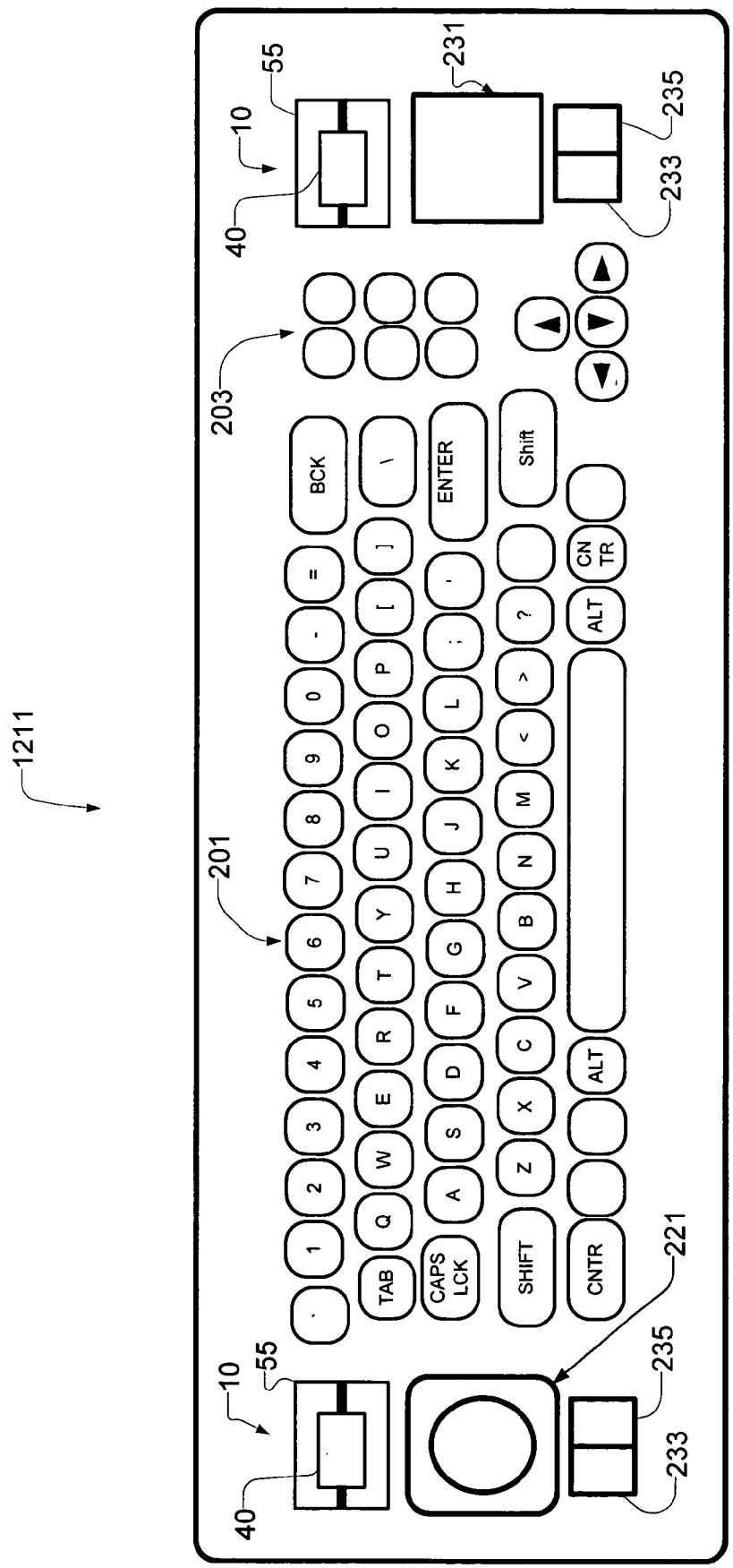
FIG. 10 is a schematic representation of a keyboard according to one embodiment of the present invention.

As shown in FIGS. 9 and 10, in one embodiment of keyboard 1209 and 1211, scroll wheel assembly 10 comprises an elongated cylindrically shaped wheel 40 secured within an opening 55 of a housing 219 for the keyboard 200. A portion of the cylindrically shaped wheel 40 protrudes above the keyboard 1209 and 1211 outer surface so that it can be easily contacted and manipulated by a user.

According to the present invention, when the user wants to scroll the image on the display screen 2 in multiple directions along multiple axes 4, 5, (see FIG. 3) he or she will both rotate and/or laterally move the wheel 40 relative to the keyboard housing 219 to produce vertical and/or lateral scrolling, respectively. As is well known in the art, when the cylindrical shaped wheel 40 and shaft are rotated by the user, the rotational motion is sensed by a rotational movement sensing system and the image 1 is scrolled in either a positive or a negative vertical direction that extends parallel to the Y-axis 4, i.e., either up or down. Any known rotational sensing system may be used. As known in the art, this rotational movement sensing system can include a light source, an encoder wheel, and a light detector. Blades on the encoder wheel periodically obstruct the light beam when the wheel 40 is rotated. The detector senses these obstructions and generates and relays a signal to the host computer 100 to scroll the image in the Y-direction up or down of vertical scrolling.

Additionally, the scroll wheel assembly 10 may include a lateral movement sensing system having at least one sensor that determines when the cylindrical shaped wheel 40 is experiencing lateral motion. Known pressure and movement sensors such as, strain gauges, contact sensors, optical sensors and mercury switches can also be used. The scroll wheel assembly 10 also includes a controller for interpreting the output from the sensor, converting it to a signal and delivering the signal to the host computer 100. The controller can be any known component or combination of components that can perform these functions.

Alternative Keyboard Environment

Figure 11:
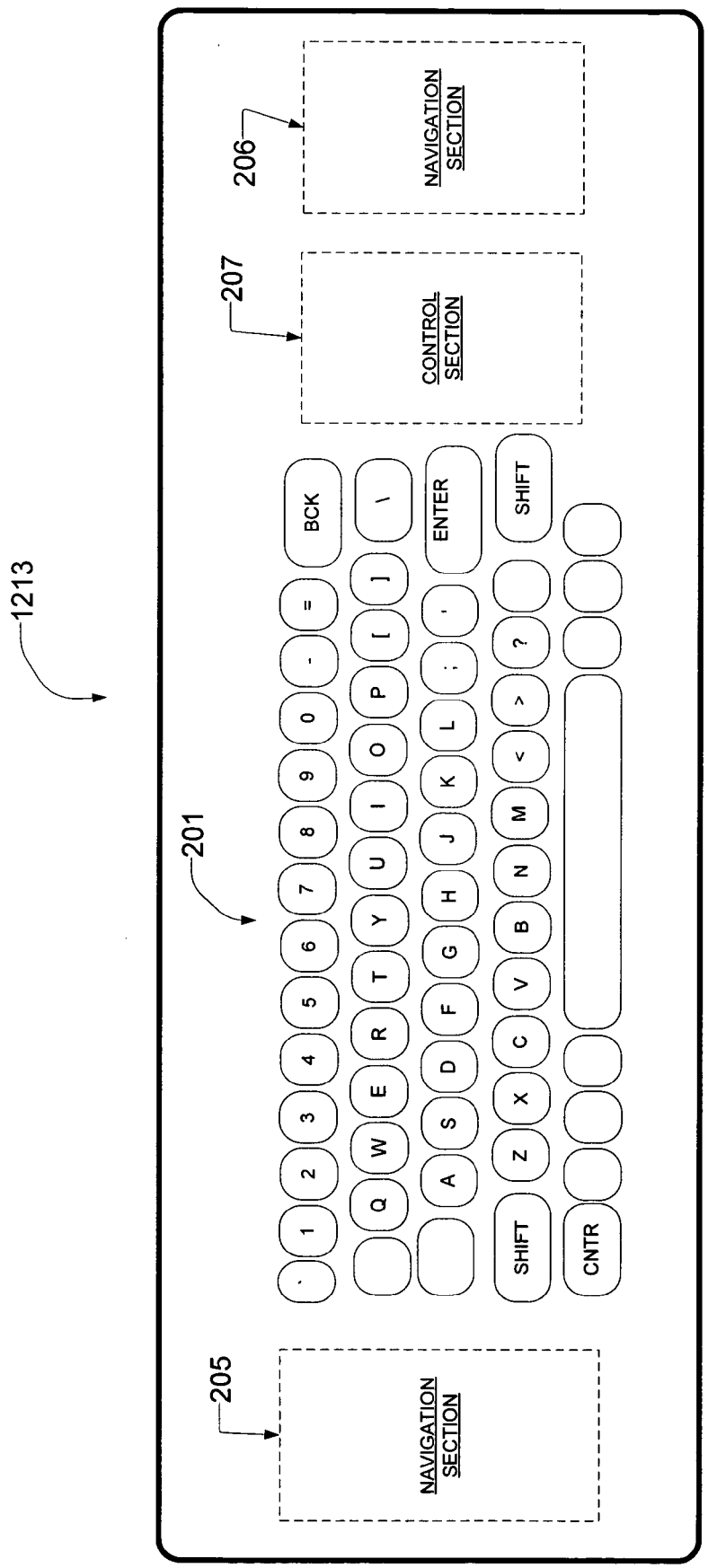
FIG. 11 is a schematic representation of a keyboard according to one embodiment of the present invention.
Figure 12:
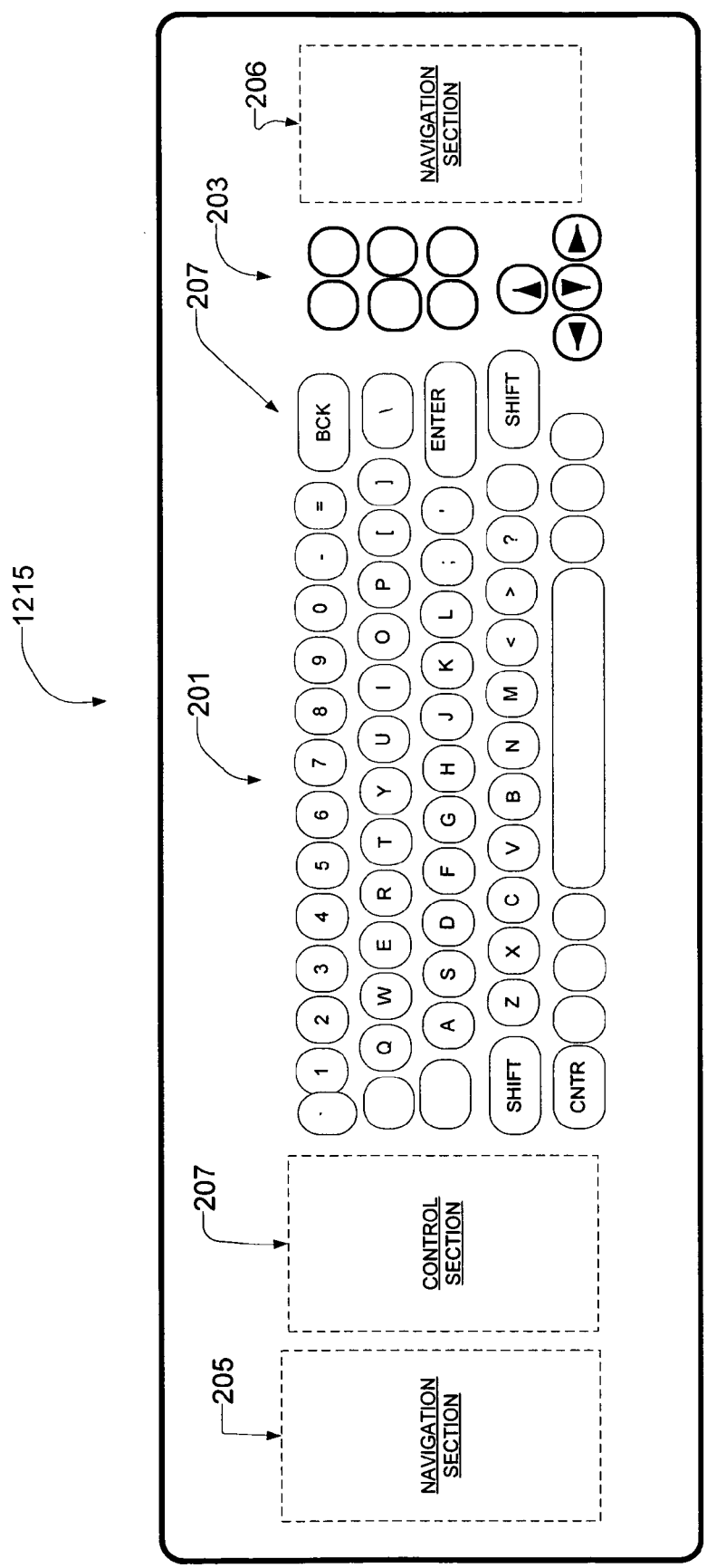
FIG. 12 is a schematic representation of a keyboard according to one embodiment of the present invention.

FIG. 11 is a schematic representation of an alternative keyboard 1213 according to one embodiment of the present invention. In lieu of an editing section, a control section 207 may be provided between the alphanumeric section 201 and navigation section 206. FIG. 12 illustrates of an alternative keyboard 1215 according to one embodiment of the present invention, in which the control section 207 is preferably located on the left side of the keyboard. This configuration allows for anatomically handiness and functions of the editing section 203 as well. In both keyboard 1213 and keyboard 1215, control section 207 may have other group of keys or buttons for various functions to allow multiple configurations. For example, there may be a pair of keys for Application Switching; a pair of keys for Copy and Paste; a pair of keys for Forward and Back; a pair of keys for Redo and Undo; a Key for Zooming. As using herein, the term "zooming" is defined as increasing or decreasing the scale of view on a display screen. In a further arrangement, keyboard 1213 can have an audio control portion in control section 207. Such as audio control portion may include a set of audio control keys, such as Command/Dictate On/Off, Microphone On/Off, Speech Correction On/Off, and the like. In another arrangement, keyboard 200 may have a telephony section having a set of keys, such as take call, transfer call, speaker phone, hold, conference call and the like.

The keys for the keyboard 200, 1200, 1201, 1203, 1205, 1209, 1211, 1213, and 1215 may be operable to provide the desired commands to the system according to any known arrangement such as the generation of an electrical signal indicative of the character, symbol, or command associated with that key. Additionally, while the keys as shown are preferably of standard size and shape for computer keyboards, it is recognized that any or all of the keys may be alternative sized and/or shaped. For example, some or all of the keys may be oval shaped.

Illustrative Scenarios

In a couch use environment, aspects of the present invention allow more than one person to use a computer and its associated screen at one time. For example, parents may instruct their children with a computer. Two people may play a computer game together. Further, two people may collaborate on the project or report for work, school or organization. Thus, each person can share typically one cursor control devices and/or one view scrolling navigation device. Thus, two cursor control and navigation devices on a keyboard presents a new, unique way of improving the collaboration experience. For example, both touchpads may be dedicated to cursor control allowing for collaboration. A person with keyboard on his lap uses a touchpad on right side, while person sitting to left of him/her uses a touchpad on the left with his/her right hand. In another example, one person, such as a collaborator, can use a touchpad, trackball, or other technology representing cursor control with their right hand, while sitting in front of keyboard and display. A second person, e.g., the fellow collaborator, can sit to left of the other person with a duplicate cursor control device location on same keyboard. Advantageously, aspects of the present invention allow for uninterrupted flow of ideas and work between to collaborating persons using the same keyboard.

Aspects of the present invention allow persons use to computers and the graphical user interface to access and enjoy a broad selection of digital media and other digital entertainment media. For example, a GUI can allow users to browse a personal music library by artist and genre. In some cases, the information presented can be wider than the width of the display screen (television screen) and the user may want to scroll vertically and horizontally across the screen to see the entire digital library or other data. Advantageously, the user can move the image horizontally across the display screen to see and enjoy their music or video program with ease. Further, the user may also have cursor control to move and edit or select graphical objects. This is in contrast to conventional systems in which, the user must stop what he or she is doing and perform a number of tedious and potentially frustrating steps. Thus, aspects of the present invention can reduce delays and user frustration and unnecessary stress of manipulating conventional systems.

Summary

Aspects of the present invention pertain to a computer keyboard configured for navigation of a graphical user interface of a host computer. A computer keyboard may include an assembly for scrolling and navigating an image in multiple directions relative to a display screen. A computer keyboard may include an assembly for control of a graphical object, insertion point or mouse cursor in multiple directions relative to objects on a display screen. A trackball device and touchpad, either both or alike of each, can be used on either side of a keyboard for scrolling and/or cursor control. Scrolling and cursor control may be accomplished one device, e.g., a trackball device or a touchpad. Alternatively, scrolling and cursor control can be provided by a wheel and touchpad or a wheel and a trackball device.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A computer keyboard configured for navigation of a graphical user interface of a host computer, comprising:
    means for permitting scrolling of content items of a display screen relative to the display screen along a first axis so as to change the direction of scrolling to movement of said content items along a second axis when scrolling along said second axis exceeds a predetermined elapsed time, said second axis being perpendicular to said first axis; and
    an input device for receiving manual movement and responsive thereto moving a graphical pointer relative to the perpendicular axes; and
    an alphanumeric section being laterally disposed between the means and the input device.

2. The computer keyboard according to claim 1, wherein the means includes a trackball assembly including a spherical member being rotatably configured to receive the manual movement; and a scrolling sensing system that determines when said spherical member is rotated for scrolling along one of the first or second axes.

3. The computer keyboard according to claim 1, wherein the means includes a spherical member being rotatably configured to receive the manual movement; and a scrolling sensing system being configured to sense a transition state of the spherical member when the member is rotated for a first directional scrolling along the first axis and responsive to the transition state change to a second directional scrolling along the second axis.

4. The computer keyboard according to claim 1, wherein the means includes a spherical member being rotatably configured to receive the manual movement; and a scrolling sensing system being configured to sense a transition state of the spherical member when the member is rotated for scrolling along one of the first or second axes.

5. The computer keyboard according to claim 1, wherein the means includes a spherical member being rotatably configured to receive the manual movement; and a scrolling sensing system that determines when said spherical member is rotated for directional scrolling along one of the first or second axes to a threshold level after a transition state of the directional scrolling so as to maintain said scrolling.

6. The computer keyboard according to claim 1, wherein the means and the input device each include a trackball device.

7. The computer keyboard according to claim 6, wherein the means includes a scroll wheel assembly.

8. The computer keyboard according to claim 1, wherein said first means includes a touchpad.

9. The computer keyboard according to claim 1, wherein the means includes a touchpad and the input device includes a trackball device.

10. The computer keyboard according to claim 1, wherein the means includes a trackball device and the input device includes a touchpad.

11. The computer keyboard according to claim 1, wherein the scrolling is responsive to voice input.

12. The computer keyboard according to claim 1, wherein the means permits adjusting a size scale of a said content item of a display screen.

13. A computer keyboard configured for navigation of a graphical user interface of a host computer, comprising:
    a keyboard housing;
    means for permitting scrolling of content items of a display screen relative to the display screen in one of a vertical direction and a horizontal direction so as to change the direction of scrolling to movement of said content items along the other of one of the vertical and horizontal direction when scrolling along the other of one of the vertical and horizontal directions exceeds a predetermined elapsed time;
    an input device for receiving manual movement and responsive thereto configured for moving a graphical pointer relative to two dimensions of the image display screen; and
    an alphanumeric section being disposed between the means and the input device.

14. The computer keyboard according to claim 13, wherein the means includes a movable ball and a scrolling sensing system that determines when said movable ball is rotated for the vertical scrolling and the horizontal scrolling.

15. The computer keyboard according to claim 13, wherein the means includes a movable ball and a scrolling sensing system being configured to sense a transition state of the movable ball when the ball is rotated for vertical scrolling and responsive to the transition state change to horizontal scrolling.

16. The computer keyboard according to claim 13, wherein the means includes a movable ball and a scrolling sensing system being configured to sense a transition state of the movable ball when the ball is rotated for horizontal scrolling, and responsive to a change in the transition state, changing said horizontal scrolling to vertical scrolling.

17. The computer keyboard according to claim 13, wherein the means includes a movable ball and a scrolling sensing system that determines when the movable ball is rotated for vertical scrolling to a threshold parameter after a transition state of the horizontal scrolling so as to maintain said vertical scrolling.

18. The computer keyboard according to claim 13, wherein the means includes a movable ball and a scrolling sensing system that determines when the movable ball is rotated for horizontal scrolling to a threshold parameter after a transition state of the vertical scrolling so as to maintain said horizontal scrolling during said rotation.

19. The computer keyboard according to claim 13, wherein said input device comprises a touchpad.

* * * * *